United States Patent [19]
Fujimaki et al.

[11] Patent Number: 5,799,003
[45] Date of Patent: Aug. 25, 1998

[54] OAM CELL TRANSMISSION METHOD AND SYSTEM

[75] Inventors: Shigeo Fujimaki, Tokyo; Ryouichi Osada, Miyagi, both of Japan

[73] Assignee: NEC Corporation, Tokyo, Japan

[21] Appl. No.: 673,361

[22] Filed: Jun. 28, 1996

[30] Foreign Application Priority Data

Jun. 30, 1995 [JP] Japan ................. 7-165124

[51] Int. Cl.$^6$ ................................. H04L 12/56
[52] U.S. Cl. ................. 370/244; 370/395; 370/528
[58] Field of Search ................. 370/218, 242, 370/244, 248, 395, 397, 522, 528; 371/68.2, 20.1, 20.4; 340/827, 825.01

[56] References Cited

U.S. PATENT DOCUMENTS 5,321,688  6/1994  Nakano et al. ................. 370/248
5,457,700  10/1995  Merchant ................. 370/395
5,461,607  10/1995  Miyagi et al. ................. 370/244
5,663,959  9/1997  Nakagawa ................. 370/395

*Primary Examiner*—Chau Nguyen
*Attorney, Agent, or Firm*—Sughrue, Mion, Zinn, Macpeak & Seas, PLLC

[57] ABSTRACT

In the case of an OAM cell for each of N paths being generated and transmitted at a rate of one OAM cell per a predetermined time period of 1 second in each of the N paths, first, N subperiods is prepared which are allocated to the N paths, respectively, and are obtained by dividing the predetermined time period by N. From the N subperiods, a single subperiod is sequentially selected. A cell stream is checked for an idle cell and the OAM cell for a single path of the N paths corresponding to the single subperiod selected is checked whether it is requested to be inserted into the cell stream within the single superiod selected. When an idle information block is first detected and the OAM cell is requested to be inserted into the cell stream, the OAM cell is inserted into the first idle cell which is first detected within the single subperiod selected.

20 Claims, 4 Drawing Sheets

# OAM CELL TRANSMISSION METHOD AND SYSTEM

BACKGROUND OF THE INVENTION

1. Field of the Invention

The present invention relates to fault management, and in particular to OAM (operation and maintenance) functions in a Broadband ISDN (Integrated Services Digital Network) system.

2. Description of the Related Art

The broadband ISDN, as known well, requires OAM functions for operations and maintenance of VP (virtual path) connections. Especially, in the case of ATM layer OAM functions for VP connection, two types of OAM signals are used for failure identification and reporting in VP connection: VP-AIS (Alarm Indication Signal) and VP-FERF (Far End Receive Failure) signals. These OAM signals are formed with OAM cells of VP-AIS and VP-FERF function types, respectively. In the case where a failure is detected by a connecting point of a VP connection, a node which is. downstream from the failure generates a VP-AIS signal in a predetermined period, which propagates to an endpoint in the downstream direction. When receiving the VP-AIS signal or detecting a VP connection failure the endpoint sends VP-FERF signal in the upstream direction. As defined in ITU-T Recommendation I.610, the rate of the VP-FERF cell generation is one cell per second in each VP.

FIG. 1 shows a conventional method of generating VP-FERF cells in the case where a VP-FERF cell is requested to be sent for each VP. In this case, each time detecting an idle cell during each period of one second, a VP-FERF cell is generated and sequentially inserted into each period of the idle cells detected for one second in the increasing order of the value of VPI (virtual path identifier). For instance, in the first period after the AIS detection, since three idle cells are detected, three VP-FERF cells are generated and inserted into each period of the detected idle cells for first three VPIs, respectively. In the second period after the AIS detection, since five idle cells are detected, five VP-FERF cells are generated and inserted into each period of the detected idle cells for first five VPIs, respectively.

However, the number of idle cells detected for one second is not always large enough to cope with the VP-FERF insertion request for all the VPIs predetermined in the systemic Therefore, the larger VPI is, the lower the chance of VP-FERF cell insertion. In other words, a probability that a VP-FERF cell fails to be inserted for a larger VPI becomes increasingly higher as the larger number of VPs.

SUMMARY OF THE INVENTION

An object of the present invention is to provide an OAM method which achieves an equalized probability for all the VPs that an OAM information block for each VP is successfully inserted into an information block stream.

Another object of the present invention is to provide a method for inserting an OAM information block into an information block stream with an equalized probability that an OAM information block for each VP fails to be inserted into the information block stream According to an aspect of the present invention, in the case of an OAM information block for one of N paths being generated and transmitted at a rate of one OAM information block per a predetermined time period in each of the N paths, first, N subperiods is prepared which are allocated to the N paths, respectively, and are obtained by dividing the predetermined time period by N. From the N subperiods, a single subperiod is selected. Preferably, the N subperiods are determined by a counter which is incremented by one according to a first clock and is reset according to a second clock. The first clock has a first period obtained by dividing the predetermined time period by N, and the second clock has a second period of the predetermined time period.

The information block stream is checked for idle information block. The OAM information block for a single path of the N paths corresponding to the single subperiod selected is checked whether it is requested to be inserted into the information block stream within the single subperiod selected.

When an idle information block is first detected and the OAM information block is requested to be inserted into the information block stream, the OAM information block is inserted into a time period of a first idle information block which is first detected within the single subperiod selected. More specifically, an insertion request flag is stored in a memory such as a register. The insertion request flag indicates that the OAM information block for a single path of the N paths corresponding to the single subperiod selected is requested to be inserted into the information block stream when the insertion request flag is set and that the OAM information block is not requested to be inserted into the information block stream when the insertion request flag is reset. When the first idle information block is detected and the insertion request flag is set, the OAM information block is inserted into the time period of the first idle information block and, at the same time, the insertion request flag is reset so as to prevent the OAM information block from being inserted again with respect to the same VP.

Therefore, a chance that an OAM information block may or may not be inserted into the information block stream is equally given to all the VPs.

According to another aspect of the present invention, it is requested that an OAM information block for a single path of the N paths corresponding to the single subperiod selected is inserted into the information block stream within the single subperiod selected. In this case, when an idle information block is detected from the information block stream within the single subperiod selected, the OAM information block is inserted into a time period of a first idle information block which is first detected within the single subperiod of the N subperiods corresponding to the single path. In other words, even when the insertion request occurs for all the VPs, a chance that an OAM information block may be inserted into the information block stream is equally given to all the VPs.

According to still another aspect of the present invention, an OAM control system at an endpoint in ATM network is provided with a first memory for storing N insertion request flags corresponding to the N paths, respectively, and an address generator for generating an address signal which selecting a single subperiod from N subperiods which are allocated to the N paths, respectively, wherein the N subperiods are obtained by dividing the predetermined time period by N. An insertion request flag is read from the first storage means according to the address signal and stored into a second memory such as a one-bit register. When an idle information block is detected from the information block stream, the OAM information block is inserted into a time period of a first idle information block which is first detected within the single subperiod selected when the insertion request flag stored in the second storage means indicates that the OAM information block is requested to be inserted into the information block stream. When no idle information block is detected by the detecting means within the single subperiod selected, the OAM information block is not inserted into the information block stream.

In order to insert the OAM information block for the single subperiod selected into the information block stream only once, the insertion request flag stored in the second memory is reset when the OAM information block is inserted into the time period of the first idle information block within the single subperiod selected.

DETAILED DESCRIPTION OF THE PREFERRED EMBODIMENT

Figure 1:
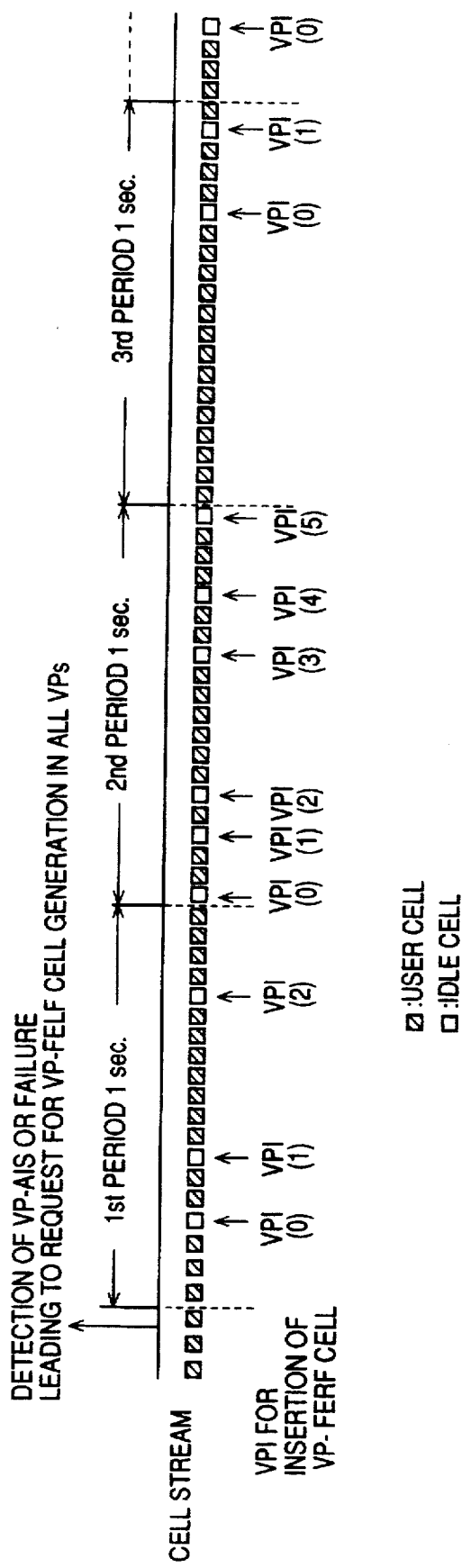
FIG. 1 is a time chart illustrating a conventional method of generating and inserting VP-FERF cells in the case where a VP-FERF cell is requested to be sent for each VP.
Figure 2:
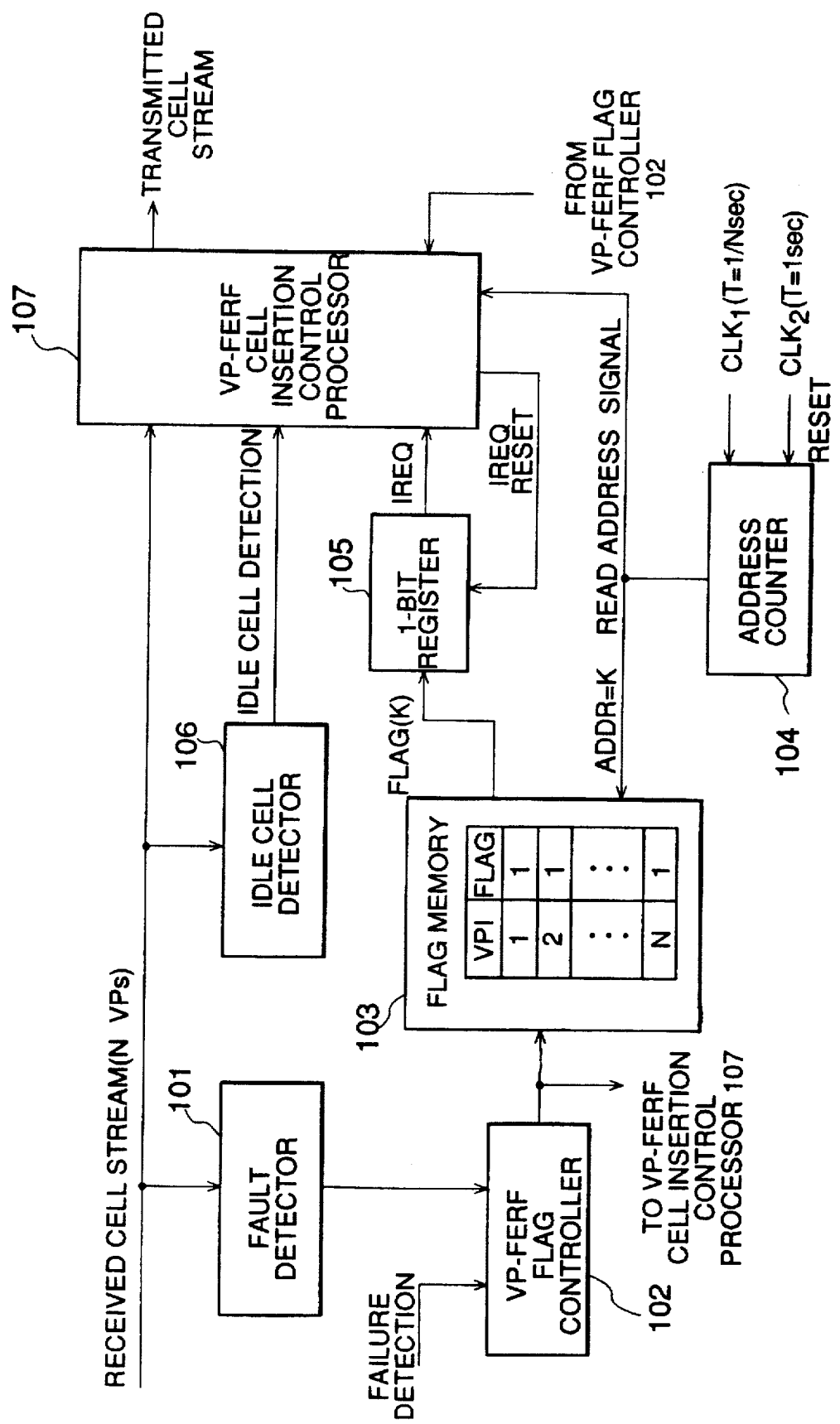
FIG. 2 is a block diagram showing a VP-FERF cell transmission system as an endpoint according to an embodiment of the present invention.

Referring to FIG. 2, a VP-FERF cell transmission system provided in ATM equipment as a VP endpoint receives a cell stream through a virtual path connection containing N virtual paths (VPs). A fault detector 101 checks the virtual path connection whether any VP-AIS cell indicating an upstream failure is received or any failure is detected from a virtual path link. When a VP-AIS cell or a failure has been detected, the fault detector 101 outputs a detection signal to a VP-FERF flag controller 102. Receiving a detection signal, the VP-FERF flag controller 102 determines whether a VP-FERF cell should be generated for each VP or for a single VP specified by the received VP-AIS cell. In the case where a VP-FERF cell is generated for each VP, which is hereinafter referred to as all VP-FERF generation case as a typical example, the VP-FERF flag controller 102 controls a flag memory 103 so that all flags are set, which means that VP-FERF cells are requested to be generated and inserted for all the VPs. Further, the VP-FERF flag controller 102 informs a VP-FERF cell insertion control processor 107 of the all VP-FERF generation case.

The flag memory 103 contains N flags corresponding to N VPIs (=1, 2, 3, . . . , N), respectively. When a flag of 1 bit is set, a VP-FERF cell will be generated for the corresponding VP, and when the flag is reset, the VP-FERF cell will not be generated for the corresponding VP. Hereinafter, K for a VPI(K) is defined as the value of a VPI in question.

An address counter 104 generates a read address signal ADDR which is incremented from 1 to N by one and reset according to a first clock $CLK_1$ of a period of 1/N seconds and a second clock $CLK_2$ of a period of 1 second. The read address signal ADDR is output to the flag memory 103 and the VP-FERF cell insertion control processor 107. According to the read address signal ADDR, the corresponding flag is read from the flag memory 103 and stored into a one-bit register 105.

The one-bit register 105 retains the flag read from the flag memory 103 until an IREQ reset signal is received from the VP-FERF cell insertion control processor 107. The flag retained in the one-bit register 105 is used as an insertion request flag IREQ by the VP-FERF cell insertion control processor 107.

An idle cell detector 106 detects idle cells from the received cell stream and outputs an idle cell detection signal to the VP-FERF cell insertion control processor 107 each time an idle cell is detected. When aware of the all VP-FERF generation case, the VP-FERF cell insertion control processor 107 starts the VP-FERF cell generation and insertion control referring to the insertion request signal IREQ, the idle cell detection signal, and the read address signal ADDR, which will be described in detail later.

Figure 3:
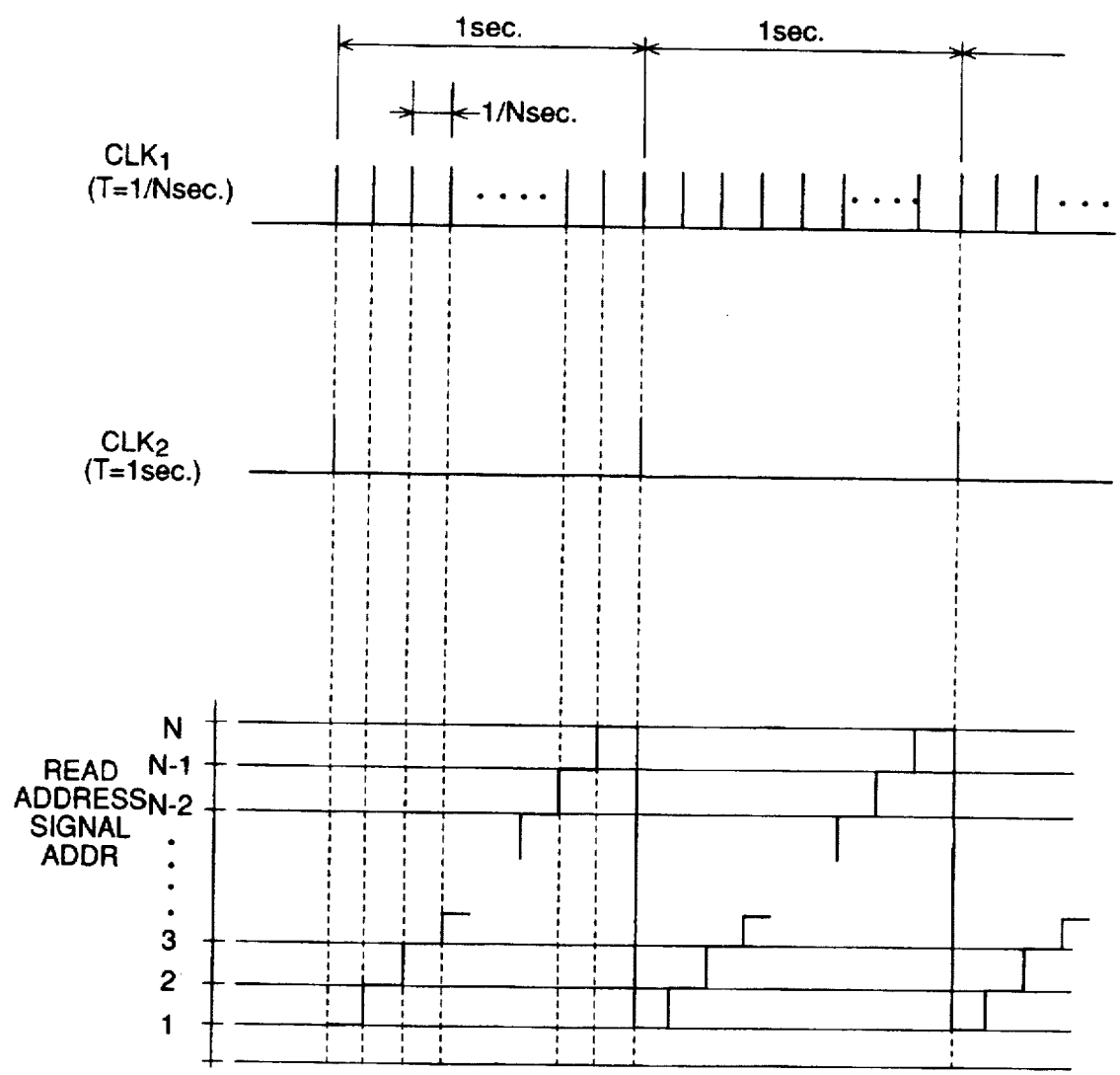
FIG. 3 is a timing chart showing a periodical change of read address according to clocks $CLK_1$ and $CLK_2$ in the embodiment.

Referring to FIG. 3, the address counter 104 generates the read address signal ADDR which is incremented from 1 to N by one according to the first clock $CLK_1$ of 1/N second period and is reset at one-second intervals according to the second clock $CLK_2$. The period of the second clock $CLK_2$ is determined to be one second based on the prescribed rate of generating and inserting VP-FERF cells, that is, one cell per second in each VP. The period of the first clock $CLK_1$ is determined to be 1/N seconds which is obtained by dividing the period of the second clock $CLK_2$ by the number N of VPs. Therefore, the flags for all VPs stored in the flag memory 103 are sequentially read one by one in the increasing order of the value K of VPI according to the read address signal ADDR. The read flag FLAG(K) of 1 bit is being retained in the one-bit register 105 until overwritten by the next flag FLAG(K+1) read from the flag memory 103.

Figure 4:
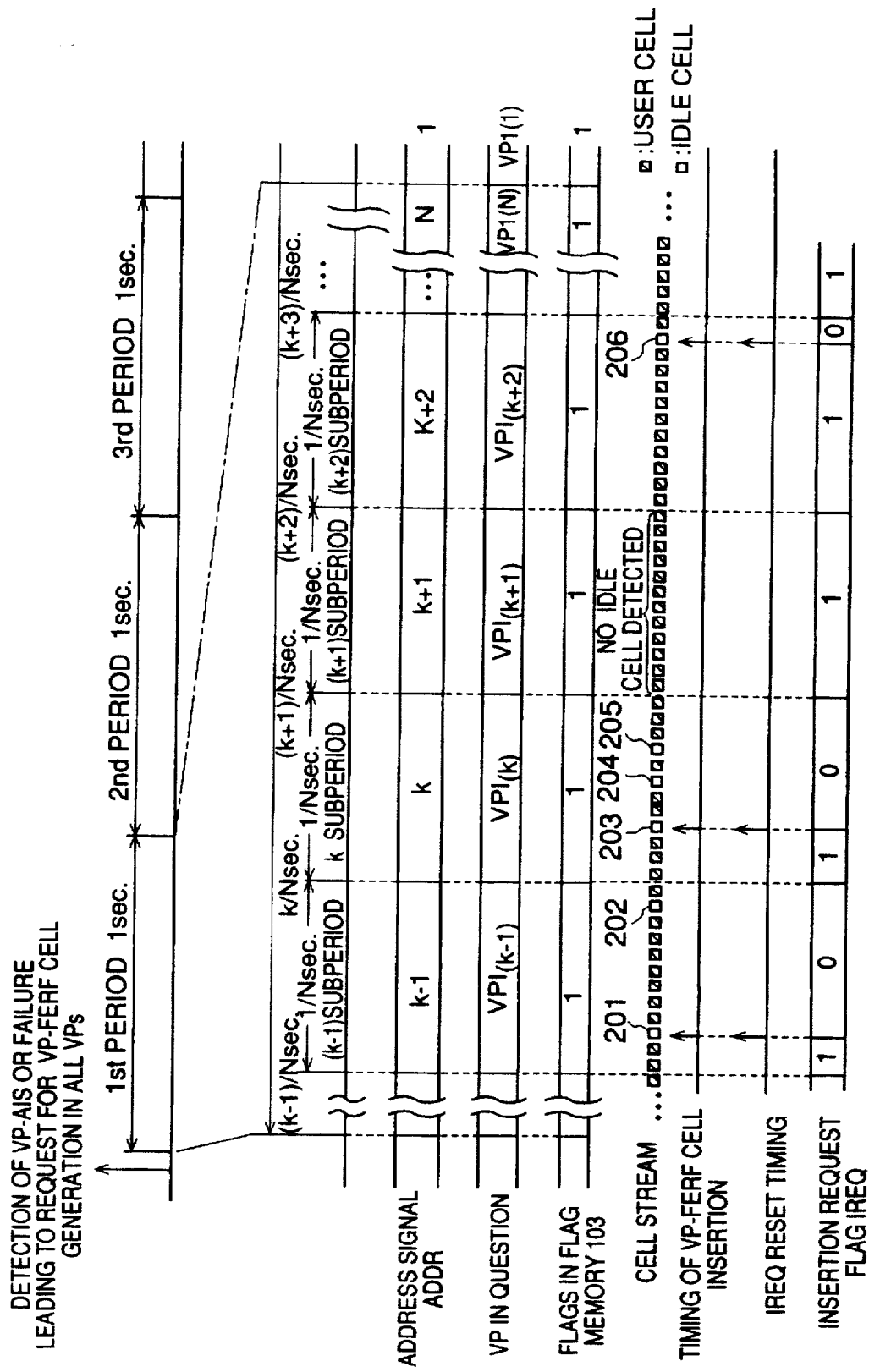
FIG. 4 is a time chart illustrating a VP-FERF cell transmission method according to the embodiment in the case where a VP-FERF cell is requested to be sent for each VP.

As illustrated in FIG. 4, after detection of the all VP-FERF generation case where VP-FERF cells are generated and inserted for all VPs, the VP-FERF cell insertion control processor 107 performs the VP-FERF cell generation and insertion control repeatedly in a one-second period until the all VP-FERF generation case is terminated.

More specifically, the VP-FERF cell insertion control processor 107 divides a one-second period into N subperiods each having a 1/N-second period according to the read address signal ADDR with allocating the N subperiods to the N VPs, respectively. As described in FIG. 3, the read address signal ADDR is incremented from 1 to N by one according to the first clock $CLK_1$ of 1/N-second period and is reset at one-second intervals according to the second clock $CLK_2$. Therefore, a VP in question is sequentially changed from the VPI(1) to VPI(N) according to the read address signal ADDR in each one-second period.

For simplicity, a part time from (K−1)/N to (K+3)/N seconds of the first period as shown in FIG. 4 is taken as an example. At the time of (K−1)/N seconds, the read address signal ADDR is incremented to K−1, and a VP in question is changed to VPI(K−1). Further, since the flags stored in the flag memory 103 are all set in this case, the flag FLAG(K−1) is read from the flag memory 103 and stored into the one-bit register 105, which causes the insertion request flag IREQ to be set to 1.

In this state, the VP-FERF cell insertion control processor 107 is receiving the cell stream while waiting the idle cell detection of the idle cell detector 106. At the time when an idle cell 201 is first detected by the idle cell detector 106, the VP-FERF cell insertion control processor 107 inserts a VP-FERF cell for the VPI(K−1) into the location of the first idle cell 201 and, at the same time, the IREQ reset signal is output to the one-bit register 105, resulting in the one-bit register 105 being reset to 0, that is, the insertion request flag IREQ being changed to 0. Since the one-bit register 105 retains the value of 0 during the remaining period, the VP-FERF cell insertion is not performed even when a second idle cell 202 is detected by the idle cell detector 106.

Subsequently, when reaching K/N seconds, the read address signal ADDR is incremented to K, and a VP in question is changed to VPI(K). Since the flags stored in the flag memory 103 are all set in this case, the flag FLAG(K) is read from the flag memory 103 and store into the, one-bit register 105, which causes the insertion request flag IREQ to be set to 1. In this state, similarly, the VP-FERF cell insertion control processor 107 is receiving the cell stream while waiting the idle cell detection of the idle cell detector 106. At the time when an idle cell 203 is first detected by the idle cell detector 106, the VP-FERF cell insertion control processor 107 inserts a VP-FERF cell for the VPI(K) into the location of the first idle cell 203 and, at the same time, the IREQ reset signal is output to the one-bit register 105, resulting in the one-bit register 105 being reset to 0, that is, the insertion request flag IREQ being changed to 0. Since the one-bit register 105 retains the value of 0 during the remaining period, the VP-FERF cell insertion is not performed even when later idle cells 202, 204, and 205 are subsequently detected by the idle cell detector 106.

In the case where no idle cell is detected during a subperiod as in the (K+1) subperiod, the one-bit register 105 retains the insertion request flag IREQ of 1. Therefore, no VP-FERF cell insertion for the VPI(K+1) is performed. When reaching (K+2)/N seconds, the read address signal ADDR is incremented from K+1 to K+2, and a VP in question is changed from VPI(K+1) to VPI(K+2). Since the flag FLAG(K+2) is read from the flag memory 103 to the one-bit register 105, the flag FLAG(K+1) is overwritten by the flag FLAG(K+2), which causes the insertion request flag IREQ to be set to 1 again.

It is the same with the (K+2) subperiod. The one-bit register 105 retains the insertion request flag IREQ of 1 until a first idle cell 206 is detected. Therefore, the VP-FERF cell insertion is performed at the time when the first idle cell 206 is detected.

Such a VP-FERF cell insertion control is repeatedly performed in each 1/N-second subperiod of each 1-second period. Since a subperiod for the VP-FERF cell insertion is equally allocated to all the VPs, a probability that a VP-FERF cell fails to be inserted is equalized for all the VPs.

What is claimed is:

1. A method for inserting an OAM (Operation and Maintenance) information block for one of N (N is a predetermined integer) paths into an information block stream at a rate of one OAM information block per a predetermined time period in each of the N paths, the method comprising the steps of:

a) preparing N subperiods which are allocated to the N paths, respectively, the N subperiods being obtained by dividing the predetermined time period by N;

b) sequentially selecting a single subperiod from the N subperiods;

c) checking the information block stream for an idle information block within the single subperiod selected;

d) checking whether the OAM information block for a single path of the N paths corresponding to the single subperiod selected is requested to be inserted into the information block stream within the single subperiod selected; and e) inserting the OAM information block into, a, time period of a first idle information block which is first detected within the single subperiod selected when the OAM information block is requested to be inserted into the information block stream.

2. The method according to claim 1, wherein, in the step (a), the N subperiods are determined by a counter which is incremented by one according to a first clock and is reset according to a second clock, the first clock having a first period obtained by dividing the predetermined time period by N, and the second clock having a second period of the predetermined time period.

3. The method according to claim 2, wherein, in the step (b), the single subperiod is sequentially selected from the N subperiods according to a count value of the counter.

4. The method according to claim 1, wherein the step (e) comprises;

storing an insertion request flag indicating that the OAM information block for a single path of the N paths corresponding to the single subperiod selected is requested to be inserted into the information block stream when the insertion request flag is set and that the OAM information block is not requested to be inserted into the information block stream when the insertion request flag is reset;

inserting the OAM information block into the time period of the first idle information block when the first idle information block is detected and the insertion request flag is set; and resetting the insertion request flag when the first idle information block is detected.

5. The method according to claim 4, wherein the insertion request flag is stored into a register which is reset when the first idle information block is detected.

6. The method according to claim 4, wherein the insertion request flag indicates that the OAM information block for each path of the N paths is requested to be inserted into the information block stream.

7. A method for inserting an OAM (Operation and Maintenance) information block for each of N (N is a predetermined integer) paths into a information block stream at a rate of one OAM information block per a predetermined time period in each of the N paths, the method comprising the steps of:

a) preparing N subperiods which are allocated to the N paths, respectively, the N subperiods being obtained by dividing the predetermined tie period by N;

b) sequentially selecting a single subperiod from the N subperiods;

c) requesting for insertion of an OAM information block for a single path of the N paths corresponding to the single subperiod selected into the information block stream within the single subperiod selected;

d) checking the information block stream for an idle information block within the single subperiod selected;

e) inserting the OAM information block into a time period of a first idle information block which is first detected within the single subperiod of the N subperiods corresponding to the single path.

8. The method according to claim 7, wherein, in the step (a), the N subperiods are determined by a counter which is incremented by one according to a first clock and is reset according to a second clock, the first clock having a first period obtained by dividing the predetermined time period by N, and the second clock having a second period of the predetermined time period.

9. The method according to claim 8, wherein, in the step (b), the single subperiod is sequentially selected from the N subperiods according to a count value of the counter.

10. The method according to claim 7, further comprising the step of:

storing N insertion request flags each indicating that the OAM information block for each path of the N paths is requested to be inserted into the information block stream.

11. The method according to claim 10, wherein the step (c) comprises:

storing an insertion request flag for a single path of the N paths corresponding to the single subperiod selected; and requesting for the insertion of the OAM information block for the single path of the N paths corresponding to the single subperiod selected into the information block stream within the single subperiod selected.

12. The method according to claim 11, wherein the insertion request flag is stored into a register which is reset when the first idle information block is detected.

13. A control system for inserting an OAM (Operation and Maintenance) information block for one of N (N is a predetermined integer) paths into an information block stream to transmit the OAM information block at a rate of one OAM information block per a predetermined time period in each of the N paths, the system comprising:

first storage means for storing N insertion request flags corresponding to the N paths, respectively;

address generating means for generating an address signal for selecting a single subperiod from N subperiods which are allocated to the N paths, respectively, the N subperiods being obtained by dividing the predetermined time period by N;

reading means for reading an insertion request flag from the first storage means according to the address signal, the insertion request flag corresponding to the single subperiod selected;

second storage means for storing the insertion request flag read from the first storage means;

detecting means for detecting an idle information block from the information block stream to produce an idle detection signal; and insertion control means responsive to the idle detection signal, for inserting the OAM information block into a time period of a first idle information block which is first detected within the single subperiod selected when the insertion request flag stored in the second storage means indicates that the OAM information block is requested to be inserted into the information block stream.

14. The control system according to claim 13, wherein the address generating means comprises:

a counter for generating the address signal which is incremented by one according to a first clock and is reset according to a second clock, the first clock having a first period obtained by dividing the predetermined time period by N, and the second clock having a second period of the predetermined time period.

15. The control system according to claim 13, wherein the insertion control means does not insert the OAM information block into the information block stream when no idle information block is detected by the detecting means within the single subperiod selected.

16. The control system according to claim 13, wherein the insertion control means resets the insertion request flag stored in the second storage means when the OAM information block is inserted into the time period of the first idle information block within the single subperiod selected.

17. The control system according to claim 13, wherein the first storage means stores the N insertion request flags each indicating that the OAM information block for each path of the N paths is requested to be inserted into the information block stream.

18. The method according to claim 1, wherein the OAM information block is a VP-FERF (virtual path - far end receive failure) cell.

19. The method according to claim 7, wherein the OAM information block is a VP-FERF cell.

20. The control system according to claim 13, wherein the OAM information block is a VP-FERF cell.

* * * * *